United States Patent [19]

Bertiger et al.

[11] Patent Number: 5,187,805

[45] Date of Patent: Feb. 16, 1993

[54] TELEMETRY, TRACKING AND CONTROL FOR SATELLITE CELLULAR COMMUNICATION SYSTEMS

[75] Inventors: Bary R. Bertiger, Scottsdale; Raymond J. Leopold, Temper; Kenneth M. Peterson, Phoenix, all of Ariz.

[73] Assignee: Motorola, Inc., Schaumburg, Ill.

[21] Appl. No.: 415,842

[22] Filed: Oct. 2, 1989

[51] Int. Cl.$^5$ ............................................. H04B 7/185
[52] U.S. Cl. ................................. 455/12.1; 455/13.1; 455/33.1; 455/54.1; 342/352
[58] Field of Search .................. 455/12, 13, 33, 54, 455/7; 342/352, 353, 357

[56] References Cited

U.S. PATENT DOCUMENTS

| | | | |
|---|---|---|---|
| 3,340,531 | 9/1967 | Kefalas et al. | 342/353 |
| 3,772,701 | 11/1973 | Wilkinson | 342/353 |
| 4,004,098 | 1/1977 | Shimasaki | 455/13 |
| 4,456,988 | 6/1984 | Nakagome et al. | 455/12 |
| 4,809,006 | 2/1989 | Dar | 342/353 |

Primary Examiner—Reinhard J. Eisenzopf
Assistant Examiner—Edward Urban
Attorney, Agent, or Firm—Frank J. Bogacz; Maurice J. Jones

[57] ABSTRACT

A Telemetry, Tracking and Control (TT&C) system for a satellite cellular communication system utilizing one of the user voice/data communication channels to communicate TT&C data with a satellite and through one satellite to other satellites. A Global Positioning Receiver (GPS) on board each satellite provides position control signals to the on board satellite control subsystem and the GPS receiver communicates ephemeris information to a ground station through the cellular user data channel. The system allows for constant TT&C communication to and from a mobile ground station and to and from any satellite.

17 Claims, 2 Drawing Sheets

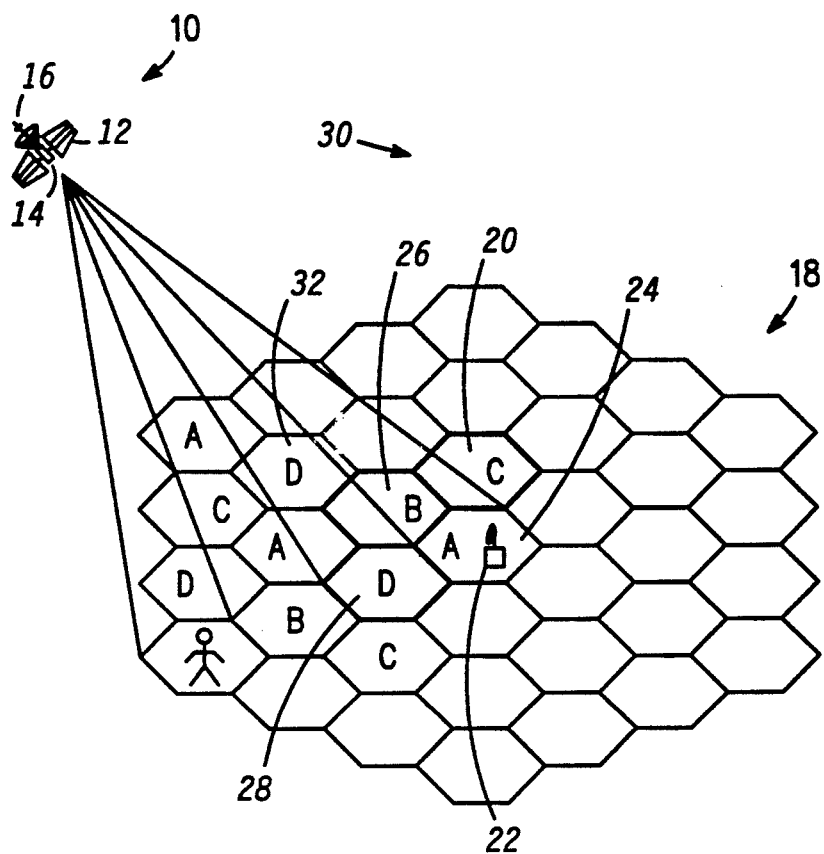
FIG. 1
FIG. 2
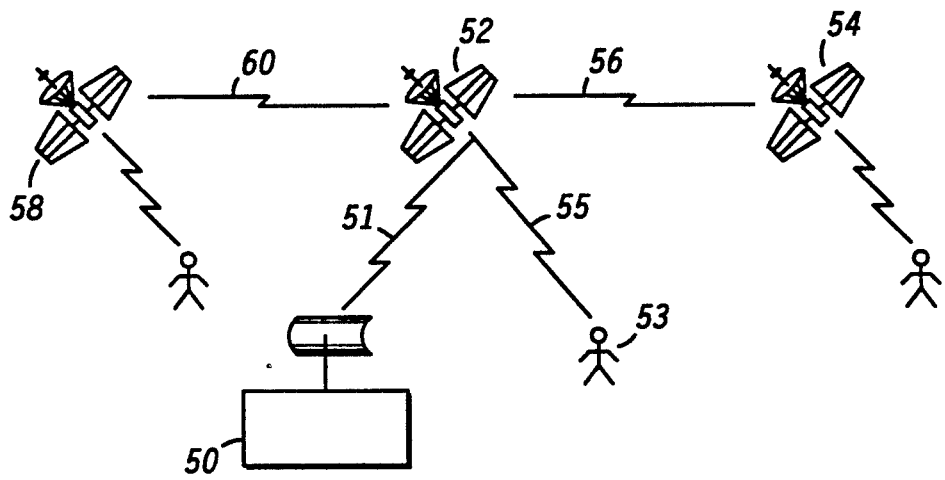

TELEMETRY, TRACKING AND CONTROL FOR SATELLITE CELLULAR COMMUNICATION SYSTEMS

CROSS REFERENCE TO RELATED APPLICATIONS

The present application is related to co-pending U.S. patent applications Ser. Nos. 263,849 entitled Satellite Cellular Telephone and Data Communication System, 402,743 entitled Power Management System For A Worldwide Multiple Satellite Communications System, U.S. Pat. No. 5,017,925 entitled Multiple Beam Deployable Space Antenna System, Ser. No. 415,815 entitled A Method To Optimize Cell-To-Cell Handoffs In A Satellite Cellular System and U.S. Pat. No. 5,095,538 entitled Calibrated Method and Device for Narrow Band Doppler Compensation.

BACKGROUND OF THE INVENTION

The subject invention generally pertains to Telemetry, Tracking and Control (TT&C) of satellites and particularly of satellites employed in global mobile communication systems employing cellular technology.

Present spacecraft or satellites for satellite constellation systems each employ a TT&C transponder that is separate from the user voice/data communication system for such satellites. These TT&C transponders generally provide for "control" commands to be sent to the spacecraft from a fixed ground station. "Telemetry" and "tracking" information is also communicated from the spacecraft to the ground station over the TT&C transponder. Thus, such communication requires a two-way transponder link between each satellite and the ground station.

Telemetry data coming from the satellite informs a network operator about the health and status of the satellite. For example, telemetry data may include the amount of remaining hydrazine fuel for propelling rockets so that the useful life of the satellite may be estimated. Moreover, critical voltage and current magnitudes are monitored and provided as telemetry data which enables the operator to determine whether or not the circuitry of the satellite is operating properly. Tracking information includes ephemeris data which allows the location of the satellite to be determined. More specifically, a present satellite system utilizes the TT&C transponder on board the satellite to send a tone down to the base station to provide the range and the range rate of the satellite. The altitude and angle of orbit of the satellite can be computed from this information by the ground station operator. The tone may be modulated to provide a higher degree of accuracy in determining the range and range rate. The ground station provides "Control" commands in response to the tracking or telemetry data to the satellite which may be utilized to adjust the orbit of the satellite by energizing a selected jet of the satellite, for instance. Moreover, other independent control commands can be provided to reprogram the operation of the satellite to control other functions of the satellite.

The TT&C information is generally encrypted to avoid undesirable interference from the signals of other operators. Prior art systems generally only allow exchange of TT&C information with a satellite when the satellite is in line of sight with the fixed ground station. Also, prior art TT&C links are between a particular fixed ground station and its satellite and generally provide no TT&C communication link with other satellites, for instance.

TT&C transponder links, that are separate from the user voice/data channels, are presently employed on hundreds of satellites. Separate transponders are generally used because the information handled by them is generally of a different nature from the information in the user communication channels. More specifically, TT&C information may be of a predominantly digital form whereas the voice/data communication of some prior art satellite systems is of an analog form which requires all of the available bandwidth for the voice/data user communication channel. Moreover, the data rate for TT&C signals is generally much lower than for user data.

Unfortunately, utilization of the foregoing systems having separate transponders for TT&C data transfer results in several problems. Such prior art systems are not capable of mobile TT&C operation. Even in satellite constellations where user voice/data channels are interlinked between various satellites, generally the non-interlinking of TT&C transponders prevents such mobile TT&C operation. Mobile TT&C operations are advantageous for trouble shooting or for situations when the system operator is required to be at any one of various locations. Also, each satellite has only one TT&C transponder which tends to be expensive because it is vital that such transponder reliably enables the associated ground station to retain control over the satellite. Moreover, these transponders utilize electrical power obtained from the onboard power generating system which usually employs solar cells and batteries. Moreover, the use of separate TT&C transponders undesirably increases the weight of the prior art satellite systems and adds to the expense of the manufacture, testing and delivery of such satellites into orbit.

SUMMARY OF THE INVENTION

Accordingly, it is an object of the present invention to provide a TT&C system which employs a voice/data channel for communication of TT&C data and hence, doesn't require a transponder that is separate from the user data/voice communication channel equipment.

Another object is to provide a TT&C system which is suitable for satellites being utilized in global, mobile, cellular communication functions.

In one form of the invention, a control system is included in a satellite communication system having at least one satellite with transceivers providing a plurality of communication channels for establishing communication among a plurality of users. The control system includes a satellite control subsystem on board each satellite and a ground station. The satellite subsystem controls the functions of the satellite. One of the user communication channels is coupled to the ground station and with the satellite control subsystem for establishing TT&C communication so that commands can be transmitted to the satellite control subsystem which responds by controlling a selected function of the satellite. The control system also includes a sensor subsystem on board the satellite for sensing predetermined conditions on the satellite and providing telemetry data through the user communication channel to the ground station. Moreover, the control system can further include a position receiver on board the satellite for monitoring and providing the ephemeris data of the satellite. The ephemeris data is coupled through the user communication channel so that the ephemeris data is sent from the satellite to the ground station. Also, the ephemeris data can be coupled to the satellite control subsystem to provide automatic on board control of the course of the satellite.

The above and other objects, features, and advantages of the present invention will be better understood from the following detailed description taken in conjunction with the accompanying drawings.

BRIEF DESCRIPTION OF THE DRAWINGS

FIG. 1 illustrates a cell pattern provided by one satellite of a multi-satellite cellular communication system;

FIG. 2 indicates cross linking between a ground control station and a plurality of a satellites.

DETAILED DESCRIPTION OF THE PREFERRED EMBODIMENT

Figure 3:
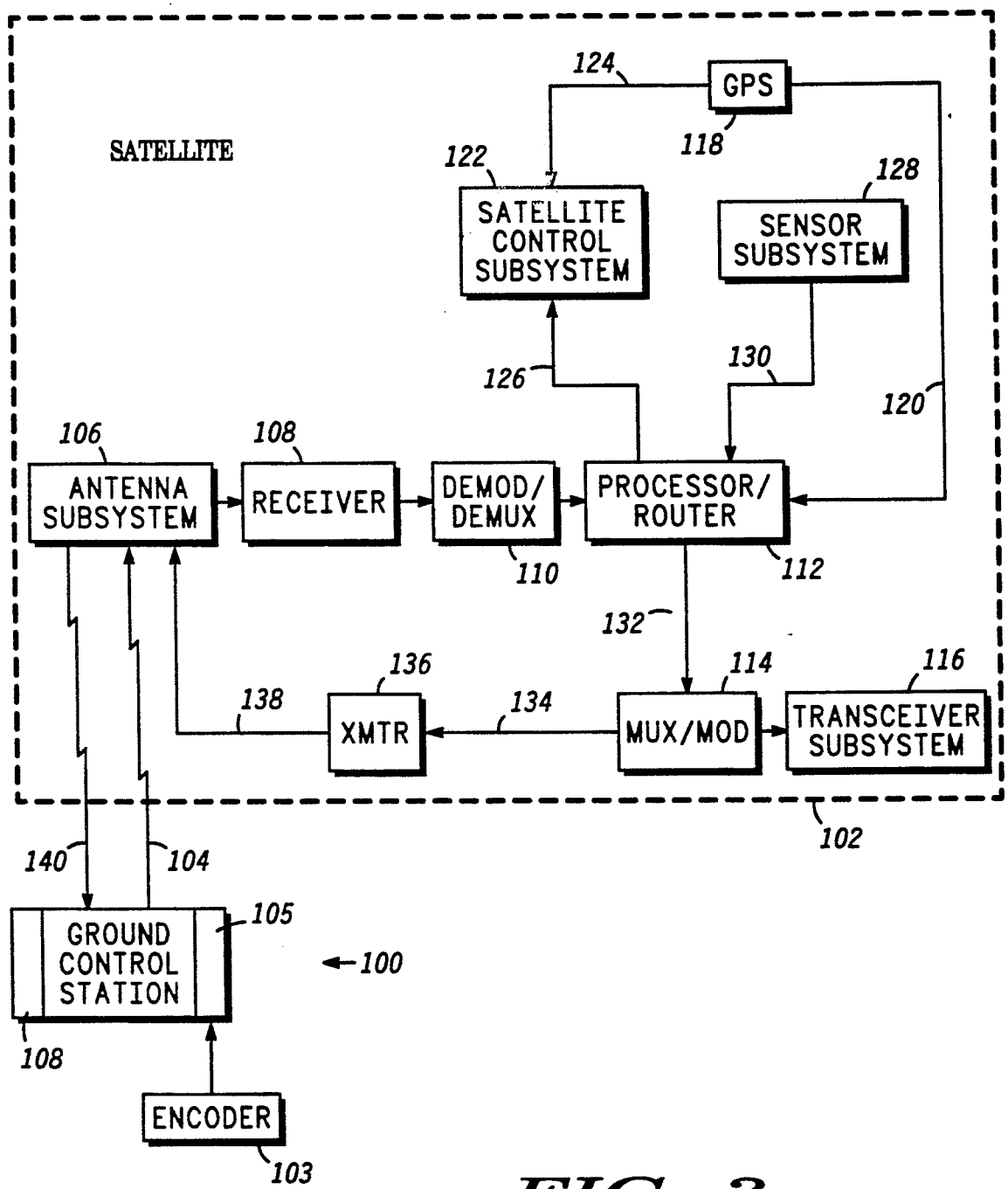
FIG. 3 is a block diagram of the electronic system for a ground control station and a satellite.

Referring now to FIG. 1, a satellite 10 is illustrated which includes a plurality of user data transmitter/receiver combinations hereinafter each called a "transceiver". Satellite 10 also includes solar receptors 12, transmitting antennas 14, and receiving antennas 16. The transmitters of the transceivers each utilizes a separate transmitting antenna 14 to simultaneously project a plurality of moving cells forming pattern 18 onto a portion of the surface of the earth. A satellite cellular system suitable for use with the subject invention is described in a patent application entitled "SATELLITE CELLULAR TELEPHONE AND DATA COMMUNICATIONS SYSTEM", Ser. No. 263,849 and which is assigned to the assignee of the subject application and which has common inventors to the subject application. The subject matter of the referenced application is incorporated herein by reference to the extent that it is not contradictory to the subject application.

Each individual cell, such as cell 20 of pattern 18, also includes the airspace above the ground and can be characterized as a conical cell. The system operator of ground station 22, even though mobile, is generally regarded as being at a fixed place on the ground relative to the rapidly moving satellite 10, which can travel at a speed of 17,000 miles per hour. The cells are always moving because satellite 10 continuously moves. This is in contrast to terrestrial mobile cellular systems wherein the cells are generally thought of as being fixed and the mobile user moves through the cells. As a cell moves "over" the user, the cellular switching system must "hand-off" the user's communication to an adjacent cell. If the satellites all move in the same direction and have substantially parallel, low earth, polar orbits, then the adjacent cell pattern and/or adjacent cell can be predicted by the cellular switching system with a high degree of accuracy. "Hand-off" can be accomplished in the manner disclosed in the aforementioned patent application. Amplitude information or alternately bit error rate information can be utilized to effectuate the "hand-off".

Each satellite pattern of the cellular system may use a plurality of four-cell clusters. One cluster includes cells 24, 26, 20 and 28 wherein the cells operate at frequencies having magnitudes respectively designated by A, B, C, and D. Nine such clusters are illustrated in FIG. 1 to provide pattern 18. The reuse of frequencies A, B, C and D divides the amount of spectrum otherwise required for communication with pattern 18 by approximately nine. One of the transceivers of satellite 10, for example, may use an uplink frequency of 1.5 gigahertz (GHz) to 1.52 GHz and a downlink frequency of 1.6 to 1.62 GHz. Each cell pattern 18 may be arranged to be 250 nautical miles in diameter and it can take 610 seconds for a satellite cellular system to process a complete cell pattern. The cellular frequency spectrum can be arranged as proposed by standards published by the Electronic Industries Association (EIA) for terrestrial cellular system coding. Digital techniques are employed by the user channels for communicating voice and/or data information from one user to another.

In accordance with the described embodiment, control station 22 located in "A" frequency cell 24 will communicate TT&C information with satellite 10 utilizing one of the cellular user voice/data communication channels instead of a separate TT&C transponder. Each of these cellular user channels represents one data/voice line identified by a route or telephone number. Typically, these channels originate and terminate on the surface of the earth. However, when used as a TT&C link termination of the channel and the recipient of a "call" can be satellite 10, for instance. Each satellite in a constellation is assigned a unique address (i.e. a telephone number). Ground station 22 can communicate directly with any satellite coming within its line of sight range by signaling the satellite's address. Similarly, ground station 22 also has a unique address.

If satellite 10 is moving in the direction of arrow 30 such that cell 26 will next move over operator 22, then "A" cell 24 will "hand-off" to "B" cell 26 which will later "hand-off" to "D" cell 32, for instance. If cell 26 becomes inoperative, then TT&C communication will be only temporarily interrupted rather than possibly completely destroyed as is the case with prior art systems having only one TT&C transponder per satellite. Hence, the cellular system of FIG. 1 provides a high degree of reliability for TT&C exchange because of the redundancy of the transceivers providing each of the cells.

Referring to FIG. 2, a ground station 50 can communicate TT&C information with a satellite 52 while in its line of sight through user channel 51. Satellite 52 receives and sends TT&C from station 50 along with multiplexed user data channels such as from user 53 over channel 55. The cellular switching network recognizes the satellite identifier or address for satellite 52 in the same manner as the network recognizes terrestrial-based destinations. Also, if it is desired to pass TT&C data to another satellite 54, which is not in the line of sight with station 50, then such data can be sent to satellite 52 and then transferred over link 56 to satellite 54. Similarly, special provision can be made for broadcasting overall network updates and TT&C data to and from every satellite in the network.

If a satellite 58 needs to communicate its health and status sensor data to ground control station 50, it originates a call and passes the data through link 60 using the unique number for satellite 52. The TT&C information is next downlinked through channel 51 to control station 50. Typically, satellites such as 52, 54 and 58 are polled for TT&C data, however, serious events affecting the health of any given satellite is originated and communicated by that satellite through other satellites, if necessary, to the control station. Thus the system of the invention allows constant communication of TT&C data to and from control station 50 even though control station 50 is not in the line of sight with the communicating satellite.

FIG. 3 shows block diagrams of ground a station 100 and a satellite 102. Ground station 100 can be either a fixed permanent station or a mobile user employing a computer having a modem for communicating through a standard telephone, for instance. Encoder 103 provides "addressed" signals to transmitter 105. Transceiver link 104 transmits signals from transmitter 105 of control station 100 to antenna subsystem 106 of satellite 102. Receiver 108 of satellite 102 is connected between antenna subsystem 106 and demodulator/demultiplexer system 110.

Router 112 is connected between the output of system 110 and the input of multiplexer/modulator 114. Router 112 also processes the addresses of all incoming data and sends appropriately addressed data to other satellites, for instance, through multiplexer/modulator 114 which is also connected to cross-link transceiver subsystem 116. Router 112 encodes the appropriate addresses onto signals having destinations other than satellite 102. Router 112 sorts out any messages for satellite 102 which are identified by their address code. Global Positioning Satellite (GPS) receiver 118 is connected to router 112 through conductor 120 and to satellite subsystem 122 through conductor 124. Router 112 is connected to satellite subsystem 122 through conductor 126 and to sensor subsystem 128 through conductor 130. Satellite control subsystem 122 decrypts command messages from router 112 for satellite 102 and cause appropriate action to be taken. Sensor subsystem 128 provides telemetry data to router 112.

Global Positioning System (GPS) receiver 118 receives information from existing GPS satellites in a known manner and determines the exact location of satellite 102 in space Orbital space vectors are derived from this information. GPS receiver 118 also determines the position of satellite 102 relative to the GPS constellation. This information is compared with the desired position information stored in router 112. Error signals are generated by GPS receiver 118 which are sent to the satellite control subsystem 122 for automatic course correction. The error signal is used within control subsystem 122 to control small rockets which effect the "course keeping" function. Hence, satellite 102 utilizes GPS information to control its own course rather than only obtaining course control from station 100. This on board control allows the position of satellite 102 to be set and controlled within a few meters.

GPS receiver 118 also provides the space vectors to router 112 and sensor subsystem 128 provides other telemetry information through conductor 130 to router 112 which composes messages that are coupled through conductor 132 to multiplexer/modulator 114 and through conductor 134, transmitter 136 and conductor 138 for transmission by antenna subsystem 106. These messages are then transmitted through link 140 to receiver 108 of ground station 100. Alternatively, when it is desired to correspond with a different control station through another satellite link, then the messages compiled by router 112 are sent through transceiver crosslink subsystem 116. Thus, each satellite can "know" its position as well as the position of its neighbors in the constellation. The ground operator also has constant access to this ephemeris information.

Hence, unlike prior art systems which don't include GPS receivers, the tracking or ephemeris data for satellite 102 is calculated on board satellite 102. Satellite 102 doesn't have to have constant tracking updates from ground station 100. Tracking control information is, however, provided by ground station 100 when desirable to do so. The GPS signal is a digital signal which is compatible with the digital cellular communication links or channels employed for ground based user-to-user communication. The foregoing method and system of providing tracking information is different from prior art methods and systems such as tone actuated satellite tracking systems presently employed through the separate TT&C transponders. The on board acquisition of the digital GPS signal format allows embedment of the tracking information in the channels normally used for voice and/or data communication.

The previously described embodiment of the invention has many advantages over prior art systems utilizing a separate TT&C transponder in each satellite. Specifically, if the transponder of the prior art system fails, then the satellite may become useless. Alternatively, since ground station 22 of FIG. 1, for instance, can use any of the transceivers associated with satellite 10, even though one of these transceivers might fail, there are still 35 others by which station 22 can maintain TT&C communication with satellite 10. Furthermore, as shown in FIG. 2, even if all of the downlinks of a particular satellite, e.g. 58, might fail, ground station 50 can communicate to that satellite through a cross link, e.g. 60, through another satellite, e.g. 52. Thus the system of the invention provides reliable TT&C communication.

Also, the TT&C system of the described embodiment can be in constant communication with a particular satellite through cross links rather than waiting for line of sight opportunities as with some prior art TT&C systems. These prior art TT&C systems require that the ground station be fixed whereas the system of the present invention can utilize mobile ground operating stations. The mobile ground station has a unique address or telephone number assigned to it and the location of the ground station can be tracked in the same manner that subscribers are tracked by the satellite cellular constellation.

In addition, by embedding the TT&C information in a voice/data channel of a cellular communication system, the expense, size, power and weight requirements of satellite for the described embodiment are minimized. Moreover, the tracking system of the described embodiment utilizes a GPS receiver on board the satellite to provide on board tracking and tracking control rather than solely relying on ground control of tracking. This digital tracking information is readily embedded in a digital cellular user channel.

We claim:

1. A control system for a satellite communication system having at least one satellite with transmitters and receivers providing a plurality of user communication channels for establishing communication among a plurality of users, the control system comprising:

satellite control subsystem means on board the satellite for controlling the functions of the satellite;

ground station control means;

first means for coupling said ground station control means to one of the user communication channels for establishing communication with said satellite control subsystem, said ground station control means thereby utilizing said one of the user communication channels for transmitting commands to said satellite control subsystem means;

said satellite including:

a plurality of transmitter and receiver means for projecting a plurality of adjacent moving cells onto the earth;

each of said cells including means for transmitting and receiving said one of the user communication channels; and hand-off means for switching said ground station control means between each of said moving cells so that said commands can continuously be provided to the satellite at least during a predetermined time period when the satellite is in the line of sight of said ground station control means; and said satellite control subsystem means being responsive to said commands from said ground station control means to enable said commands to control a selected function of the satellite.

2. The control system of claim 1 wherein said first means for coupling includes:

further transmitting means included in said ground station control means;

encoding means coupled to said further transmitting means for encoding a predetermined satellite address code on said commands for the satellite;

the satellite further having routing means coupled to the receiver thereof, said routing means recognizing and being responsive to said predetermined satellite address code to provide said commands; and second means for coupling said satellite control subsystem to said routing means so that said satellite control subsystem receives said commands.

3. The control system of claim 1 further including:

sensor subsystem means on board the satellite for sensing predetermined conditions on the satellite and providing telemetry data in response thereto; and second means for coupling said sensor subsystem through said one of the user communication channels so that said telemetry data can be sent from the satellite to said ground station control means.

4. The control system of claim 3 wherein said second means for coupling further includes:

router means coupled to said sensor subsystem means, said router means encoding said telemetry data with an address code corresponding to said ground station control means; and said router means providing said encoded telemetry data through the satellite transmitter to thereby employ said one of the user communication channels.

5. The control system of claim 1 further including:

position receiver means on board the satellite for monitoring and providing the ephemeris data of the satellite; and second means for coupling said ephemeris data through said one of the user communication channels so that said ephemeris data is sent from the satellite to said ground station control means.

6. The control system of claim 5 wherein said second means for coupling further includes:

router means coupled to said position receiver means, said router means encoding said ephemeris data with an address code corresponding to said ground station control means; and said router means being coupled to the transmitter included in the satellite so that the transmitter provides said ephemeris data to said ground station control means through said one of the user communication channels.

7. The control system of claim 1 wherein said ground station means is mobile.

8. The control system of claim 1 wherein the satellite communication system includes:

a plurality of satellites which are cross linked so they establish user communication channels with each other; and further including means enabling said ground station means to send said commands through said one of the user communication channels to one of said plurality of satellites through another of said plurality of satellites cross linked thereto.

9. The control system of claim 1 wherein the satellite communication system further includes cellular switching means.

10. A telemetry, tracking and control system for a satellite cellular communication system having a plurality of satellites each having transmitters and receivers providing a plurality of user communication channels for establishing communication among a plurality of users, the control system comprising:

control subsystem means on board each satellite for controlling the functions of the satellite;

position receiving means on board the satellite for determining the position of the satellite;

said satellite including:

a plurality of transmitter and receiver means for projecting a plurality of adjacent moving cells onto the earth;

each of said cells including means for transmitting and receiving said one of the user communication channels; and hand-off means for switching said ground station control means between each of said moving cells so that said commands can continuously be provided to the satellite at least during a predetermined time period when the satellite is in the line of sight of said ground station control means;

ground station means; and first means for coupling said ground station means to one of the user communication channels for establishing communication with said control subsystem means and said position receiving means, said ground station means thereby utilizing said one of the user communication channels for transmitting commands to said control subsystem means and for receiving data from said position receiving means.

11. The telemetry, tracking and control system of claim 10 further including:

second means coupling said position receiving means to said control subsystem means, said position receiving means providing course control signals to said control subsystem means for controlling the course of the satellite; and said control subsystem means being responsive to said commands from said ground station means to enable said commands to control a selected function of the satellite.

12. The telemetry, tracking and control system of claim 10 wherein said first means for coupling includes:

further transmitting means included in said ground station means;

encoding means coupled to said further transmitting means for encoding a predetermined satellite address code on said commands for the satellite;

each satellite further having routing means coupled to the receiver thereof, said routing means recognizing and being responsive to said predetermined satellite address code to provide said commands thereto; and second means for coupling said control subsystem means to said routing means so that said control subsystem means receives said commands from said ground station means.

13. The telemetry, tracking and control system of claim 10 further including:

sensor subsystem means on board each satellite for sensing predetermined conditions on the satellite and providing telemetry data in response thereto; and second means for coupling said sensor subsystem through said one of the user communication channels so that said telemetry data can be sent from the satellite to said ground station means.

14. The telemetry, tracking and control system of claim 13 wherein said second means for coupling further includes:

router means coupled to said sensor subsystem means, said router means encoding said telemetry data with an address code corresponding to said ground station means; and said router means providing said encoded telemetry data through the satellite transmitter to employ said one of the user communication channels.

15. The telemetry, tracking and control system of claim 10 wherein said ground station means is mobile.

16. The telemetry, tracking and control system of claim 10 wherein the satellite communication system includes:

a plurality of satellites which are cross linked so that they establish user communication channels with each other; and further including means enabling said ground station means to send said command signals through said one of the user communication channels to one of said plurality of satellites through another of said plurality of satellites cross linked thereto.

17. The telemetry, tracking and control system of claim 10 wherein the satellite communication system further includes cellular switching means.

* * * * *